UNITED STATES PATENT OFFICE.

ARNOLD MOHN, OF CHICAGO, ILLINOIS.

WATERPROOFING.

REISSUED 1,397,738.     Specification of Letters Patent.     Patented Nov. 22, 1921.

No Drawing.     Application filed July 24, 1920. Serial No. 398,687.

*To all whom it may concern:*

Be it known that I, ARNOLD MOHN, a citizen of Switzerland, residing at Chicago, in the county of Cook and State of Illinois, have invented certain new and useful Improvements in Waterproofing, of which the following is a specification.

This invention relates to improvements in waterproofing, and it has for an object the production of a waterproofing substance and a process for applying waterproofing substances to serve various purposes such as to render cloths, papers, and other substances impervious to water, or to prevent oxidation of metals.

The result of carrying out the waterproofing process which I have discovered consists in imparting to the surface, to be waterproofed, or to be protected from oxidation or other injury due to moisture and the like, a thin coat of substantially pure aluminum stearate. The process consists in selecting a relatively small amount of powdered aluminum stearate and a relatively very large amount of some suitable solvent. The solvent which I prefer for the purpose is carbon tetrachlorid; and, while other relative proportions of the substances may be used, I prefer for the purpose substantially one part by weight of the aluminum stearate to 58 parts of the carbon tetrachlorid. The substances are thoroughly mixed in a suitable vessel, such as a metal kettle; and the mixture is then heated and boiled for substantially one hour when the aluminum stearate will be entirely dissolved in the tetrachlorid. The boiling is carried on in conjunction with a reflux condenser, so that the vapors driven off are at once condensed and returned to the kettle, so as to maintain substantially the same proportions of the two substances during the process.

The substance thus produced is a colloidal solution of pure aluminum stearate in a thin volatile solvent. As a consequence, by applying the solution to the surface to be protected the fluid flows into all of the interstices of the surface, the volatile solvent evaporates, and the colloidal aluminum stearate is deposited on the substance forming a thin, but firm, transparent, flexible, closely adhering coat, insoluble in water or other ordinary liquids and sufficiently filling the pores of any porous substances to prevent moisture penetrating. Hence my process consists also in applying, in any suitable manner, a coat of the solution to the surface to be impregnated, and in causing the solvent to evaporate by exposure to the air or by using any suitable means for hastening the evaporation.

As the solvent comprises such a large proportion of the waterproofing substance, to avoid waste of the solvent, another step in the process which may be taken, is to drive off the solvent, by any suitable means, such as to warm the surface, or pass over it a stream of warm air, and then collect and condense the vapor which passes off from the surface. I thus apply to the surface to be protected a suitable waterproofing coat, using the solvent merely as a carrier of the waterproofing substance; and the only expense for material is due to the aluminum stearate which is used, as the solvent may be used for a new solution.

The substance which is produced during the carrying out of the above described process is a thin colloidal solution of aluminum stearate in a suitable solvent such as carbon tetrachlorid, the stearate being thoroughly dissolved and in such a condition that it will be carried by the solvent into all of the interstices of the surfaces to be protected, and then will be deposited firmly on the surfaces free from impurities including the solvent itself. This solution may be inclosed in any suitable containers, and may be transported whenever desired and used at pleasure. The amount of stearate is so small when in the solution it may be said to be in an extremely rarefied condition supported or carried by the solvent; and hence the process ultimately results in depositing a coherent film of the stearate on the surface, by means of the carrier, as the rarefied stearate is left behind as a residue while the solvent is evaporating.

I claim as my invention:

1. A process of making waterproofing composition consisting in mixing a relatively small amount of aluminum stearate in a solution of carbon tetrachlorid, in boiling the mixture for a material length of time until the stearate is thoroughly dissolved, and in maintaining during the boiling process substantially the same proportions of the substances.

2. An article of manufacture for waterproofing comprising a solution of a relatively small amount of aluminum stearate dissolved in carbon tetrachlorid.

3. An article of manufacture for waterproofing comprising a solution of a relatively small amount of aluminum stearate dissolved in carbon tetrachlorid, the proportions being one part by weight of the stearate to 58 parts of the tetrachlorid.

In testimony whereof, I hereunto set my hand.

ARNOLD MOHN.